United States Patent [19]

Harney et al.

[11] Patent Number: 4,963,966
[45] Date of Patent: Oct. 16, 1990

[54] CATV DISTRIBUTION SYSTEM, ESPECIALLY ADAPTED FOR OFF-PREMISES PREMIUM CHANNEL INTERDICTION

[75] Inventors: Michael Harney, Atlanta; Mark Doremus, Lawrenceville; Steve Nussrallah, Alpharetta; Roy Lowcock, Lawrenceville; Lamar West, Jr., Maysville, all of Ga.

[73] Assignee: Scientific Atlanta, Inc., Atlanta, Ga.

[21] Appl. No.: 445,316

[22] Filed: Dec. 4, 1989

[51] Int. Cl.$^5$ .......................................... H04N 7/167
[52] U.S. Cl. ...................... 358/349; 380/52
[58] Field of Search ................. 380/52; 358/349, 86; 455/3, 6; 439/528

[56] References Cited

U.S. PATENT DOCUMENTS

| | | | |
|---|---|---|---|
| 4,135,157 | 1/1979 | den Toonder | 455/6 |
| 4,378,537 | 3/1983 | Scandurra | 455/6 X |
| 4,578,702 | 3/1986 | Campbell, III | 358/86 |
| 4,641,363 | 2/1987 | Hasegawa | 358/86 X |
| 4,887,979 | 12/1989 | Jacobs | 439/528 |

OTHER PUBLICATIONS

Sylvania Pathmaker CATV Wide Spectrum Cable Communications Equipment; Brochure; pp. 1–25; Jul. 1971.

Primary Examiner—Thomas H. Tarcza
Assistant Examiner—Tod R. Swann
Attorney, Agent, or Firm—Martin Lukacher

[57] ABSTRACT

Equipment for use in CATV lines and a system for distribution of CATV signals and for power to operate CATV line equipment having active devices which require power is described. The system distributes CATV signals to subscribers who have ordered different levels of service (basic service without premium channels or different groups of premium channels). Housings are located in proximity to the premises of both actual subscribers and potential subscribers, and have like covers which contain tapping electronics (a directional coupler, line equalizers and power bypassing circuit). The cover has ports at opposite ends and an additional port at one end. The tapping electronics is located on a seizure board having seizure blocks spaced from each other along one edge of the board. The seizure board is rotatable ninety degrees (90°) so that the blocks are aligned with the ports at the opposite ends of the cover when the cover and housing unit are aerial mounted or with the ports at one end of the cover to receive the cable when the housing is pedestal mounted. Different enclosure units are attached to the cover and are configured and equipped with different types of electronics depending upon the level of service and/or the technology used to control the transmission of the CATV signals in accordance with the level of service for particular subscribers. A larger enclosure unit contains interdiction electronics which is addressable by signals from the head end of the CATV system to control frequency agile oscillators which generate the signals for jamming selected premium channels. A smaller enclosure unit contains the splitting electronics and may contain band reject filter(s) which block transmission of premium channels not ordered by the subscribers. The housing in proximity to potential subscriber premises has an enclosure unit provided by a plate and the tapping circuits are terminated with loads simulating the subscriber loads. If desired a circuit board having a splitter may be located in the housing and connectors attached to the plate. External band reject filters may be mounted on the plate at the connectors. Power distribution along the cable is controlled by bypass circuits, containing an RF choke and switching means (a jumper) which is connected across a capacitor which blocks power (60 Hz AC) so that the power bypass circuit does not adversely affect the transmission of the RF CATV signals.

55 Claims, 10 Drawing Sheets

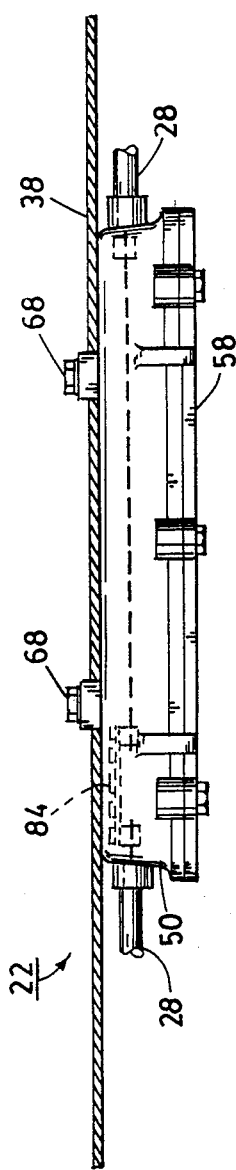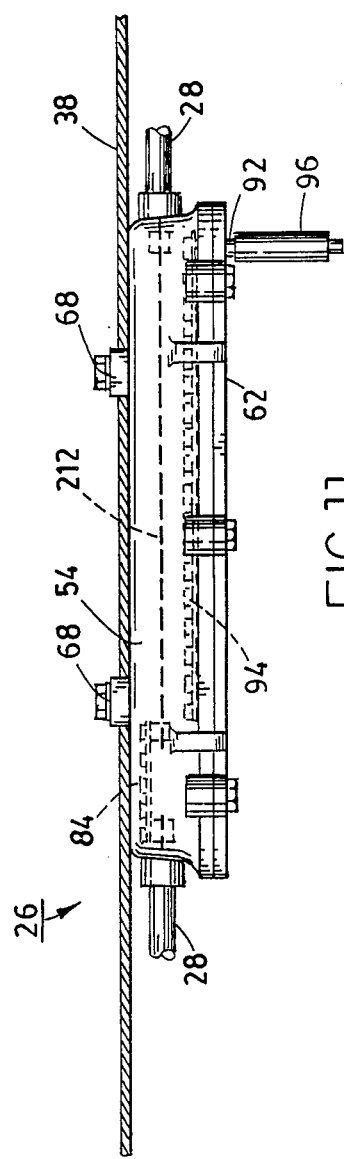

CATV DISTRIBUTION SYSTEM, ESPECIALLY ADAPTED FOR OFF-PREMISES PREMIUM CHANNEL INTERDICTION DESCRIPTION

The present invention relates to systems for the distribution of broad band signals over a transmission line to users and potential users of such signals and to equipment usable in such lines which facilitate and control the distribution of these signals to users, and particularly to CATV distribution systems and line equipment therefor.

The invention is especially adapted for use in CATV distribution systems where equipment for connecting subscribers to the line and controlling the distribution of the signals is located off premise (not entirely within the home of the subscribers). Aspects of the invention will also be found useful where ever it is desired to maximize commonality of line equipment, to enable the line equipment to be mounted either along side an above ground cable (on an aerial, pole mounted line) or on a pedestal where the cable is on or below the ground, and where power for operating line equipment is routed with the CATV signals on the same cable. While the system and equipment aspects of the invention are especially useful in the distribution of CATV signals, they may also be found useful in the distribution of other signals such as broad band PCM data signals for video, telephony and other services.

Distribution of CATV signals requires provision for different levels of service which are ordered by different subscribers. Some subscribers order only basic service, while others may order one or more premium channels. The distribution problem is further complicated by the need to serve potential subscribers without substantial modification to the system and without disrupting service to subscribers already connected to the cable. The problem has been complicated by the need for providing programming control to effect different levels of service by means of electronics that are physically located outside the subscribers home (off premises). This need has required housings, which are adapted to be located off premises adjacent to a cable which may be aerial mounted (above ground) or on pedestals adjacent to cables routed underground. The housings and the electronics contained therein may be referred to as line equipment.

In order for the distribution system to be economically effective so that the cable operator can provide service at reasonable cost, both as regards initial installations and maintenance, commonality of the line equipment must be maximized.

It is necessary that such commonality be maintained not withstanding that the line equipment is adapted for aerial or pedestal mounting and even where a potential subscriber is not yet connected to the cable.

Further complicating the distribution system is the need to allow continued use of equipment such as converters or other electronics inside the subscribers home for the balance of the useful lifetime of such equipment. Still further it is desirable to provide flexibility so as to enable use of lower cost technologies for controlling signal distribution; for example negative traps or band rejection filters to block premium channels which are not subscribed, and to provide basic service only using more complex addressable interdiction systems which insert interfering carriers near the video carrier frequency of TV channels which are denied to a subscriber when necessary. Such flexibility is desirable while maintaining commonality of equipment throughout the distribution system to a maximum possible extent.

The problems of distribution are further complicated by the need to carry power for operating off premises equipment containing active devices and line amplifiers on the cable which also carries the CATV signals. Several power supplies, usually inserting AC at power line frequencies are used along the cable. To avoid interference (because the AC current may be out of phase or because one supply may present a different load to the line than another), it is desirable to disconnect the power carrying path at one or more locations along the cable. Providing such disconnections without adversely affecting the transmission of the RF (the CATV signals), such as loss of the signals or perturbation of the spectral response of the distribution system across the band, is necessary to maintain the quality of the signals and the pictures reproduced therefrom.

It is the principal object of the present invention to provide an improved system for the distribution of broad band signals, (particularly CATV signals) and equipment for use in such a distribution system where the foregoing problems are substantially resolved and the needs discussed above are substantially fulfilled.

It is a still further object of the present invention to provide an improved system for distribution of CATV signals wherein the line equipment for connecting the cable of the system to subscribers is located off the subscribers premises (viz. not located physically inside the subscribers home)

It is a still further object of the invention to provide improved line equipment for CATV distribution systems which may be used off the premises of potential subscribers which maintains the integrity off the signal and does not adversely affect the distribution of the signal to other subscribers which may already be connected to the line, and facilitates the connection of the potential subscriber to the line when service is ordered by that subscriber.

It is a still further object of the present invention to provide improved line equipment useful in CATV distribution systems which provides commonality both for aerial and pedestal mounting, and may readily be changed over for pedestal or aerial mounting as the need arises.

It is a still further object of the present invention to provide circuitry for routing power along a cable which carries RF signals, and particularly broad band RF signals such as CATV signals, which controls the distribution of the power so that different power supplies can serve different portions of the line and supply power to devices such as amplifiers and control systems requiring power, without interference from other power supplies and without interfering with the transmission of the RF signals.

Briefly described, a signal distribution system in accordance with the invention is capable of distributing CATV and other broad band RF signals. The use of "CATV" shall be deemed to include such other RF and broad band signals as appropriate. The system distributes the signals to a plurality of premises where subscribers have subscribed for different levels of service and where potential subscribers are located. The system uses a cable (which term is meant to include other transmission lines) which traverses a path in proximity to the premises of the subscribers and potential subscribers. Means are provided, such as the head end or hub of a CATV system, for generating and propagating the signal along the cable. The cable has a plurality of gaps adjacent different ones of the plurality of premises of the subscribers or potential subscribers. A plurality of circuits having devices for tapping the signal from the cable are connected to the cable in different ones of the gaps. There are a plurality of housings each having a cover. The tapping circuits are disposed entirely in the cover. A plurality of different enclosure units are provided which are adapted to close the covers when attached thereto. Means for controlling the signals distributed to subscribers, in accordance with the level of service to which they have subscribed is contained in the enclosure units and the tapping circuits are connected in signal communicating relationship with the controlling means. Other enclosure units are plates which close the covers when attached thereto. These plates are attached to the covers to constitute others of the housings which are located in proximity to the potential subscribers premises. In the later housings the tapping circuits are electrically terminated so as to simulate the load which would be presented by actual subscribers connected to the cable. Certain other of the enclosure units may contain splitting circuits, with or without band reject filters, to deny selected (premium) channels or to enable the use of electronics inside of the subscribers home, which may consist of a set top converter (addressable or nonaddressable) to provide the requisite level of service. Accordingly, commonality is preserved, as well as flexibility, in providing the level of service ordered by the subscribers from the cable operator.

To obtain further commonality, the housings and particularly the covers thereof are arranged so as to be adapted for aerial or pedestal mounting with minimal modification. The housings, preferably the cover thereof are generally rectangular and have two ports in alignment at opposite ends and a third port at one of the opposite ends. A seizure board having seizures disposed along one end is mounted in the housing on mounting means which enables the board to be rotated from a first to a second position. In the first position, the seizure blocks are aligned with the ports at the opposite ends of the housing so that the incoming cable may be connected to one seizure block and the outgoing cable to the other. Then the housing is adapted for aerial mounting as by clamping the cover to the strand which supports the cable above ground. This strand is of course connected to poles, such as telephone poles, which are located in proximity to the subscribers premises. When the underground cables are used a pedestal is provided to which the housing is attached. Then the seizure board is rotated to its second position so that the seizure blocks are in alignment each with a different one of the two ports at one end of the housing. Then the incoming cable and the outgoing cable are connected through the ports on that end of the housing and connected to the seizure blocks adjacent thereto. Commonality of equipment is further preserved and the need for jumpers or switches which could adversely affect the transmission of the CATV signals to route them to either the ports at the opposite ends or the ports at the same end of the housing are avoided.

Where the cable carries power supply current in addition to CATV signals, a circuit is provided for bypassing the active device; for example the tapping circuit which is located on the seizure board. This bypassing circuit is also preferably located on the seizure board. The bypassing circuit may be used to bypass other active devices for carrying power along the cable, for example by bridging a line amplifier. The bypassing circuit preferably includes a RF choke (an inductor) which blocks the transmission of the CATV signals but passes the power current which is of much much lower frequency (viz. 60Hz as opposed to 50MHz at the bottom of the CATV band). Switching means, such as a jumper is connected in series with the choke. The switching means is opened when it is desirable to terminate the flow of power current further down stream the cable from the power supply which inserts the power current into the cable thereby preventing interactions with other power supplies which insert power further down stream of the cable. In order to prevent losses or reflections (open transmission line effects) which can adversely effect and interfere with the transmission of the CATV RF signals, the switching means is shunted by a capacitor of sufficiently high value of capacitance to be essentially transparent to the CATV RF signals. This capacitor is in the RF signal path. The choke is therefore terminated both when the switching means is open and closed, and the electrical effect of the choke on the cable remains unchanged even though the power current path is opened.

The foregoing and other objects, features and advantages of the invention as well as a presently preferred embodiment thereof will become more apparent from a reading of the following description in connection with the accompanying drawings in which;

FIG. 10 is an elevational view similar to FIG. 2 showing one of the housings illustrated in FIG. 1, which, is intended for use where no cable service is provided, in the proximity of the premise of Potential subscribers;

FIG. 11 is a view similar to FIG. 10 of a housing which is adapted to contain and mount components for distributing signals to subscribers;

Figure 1:
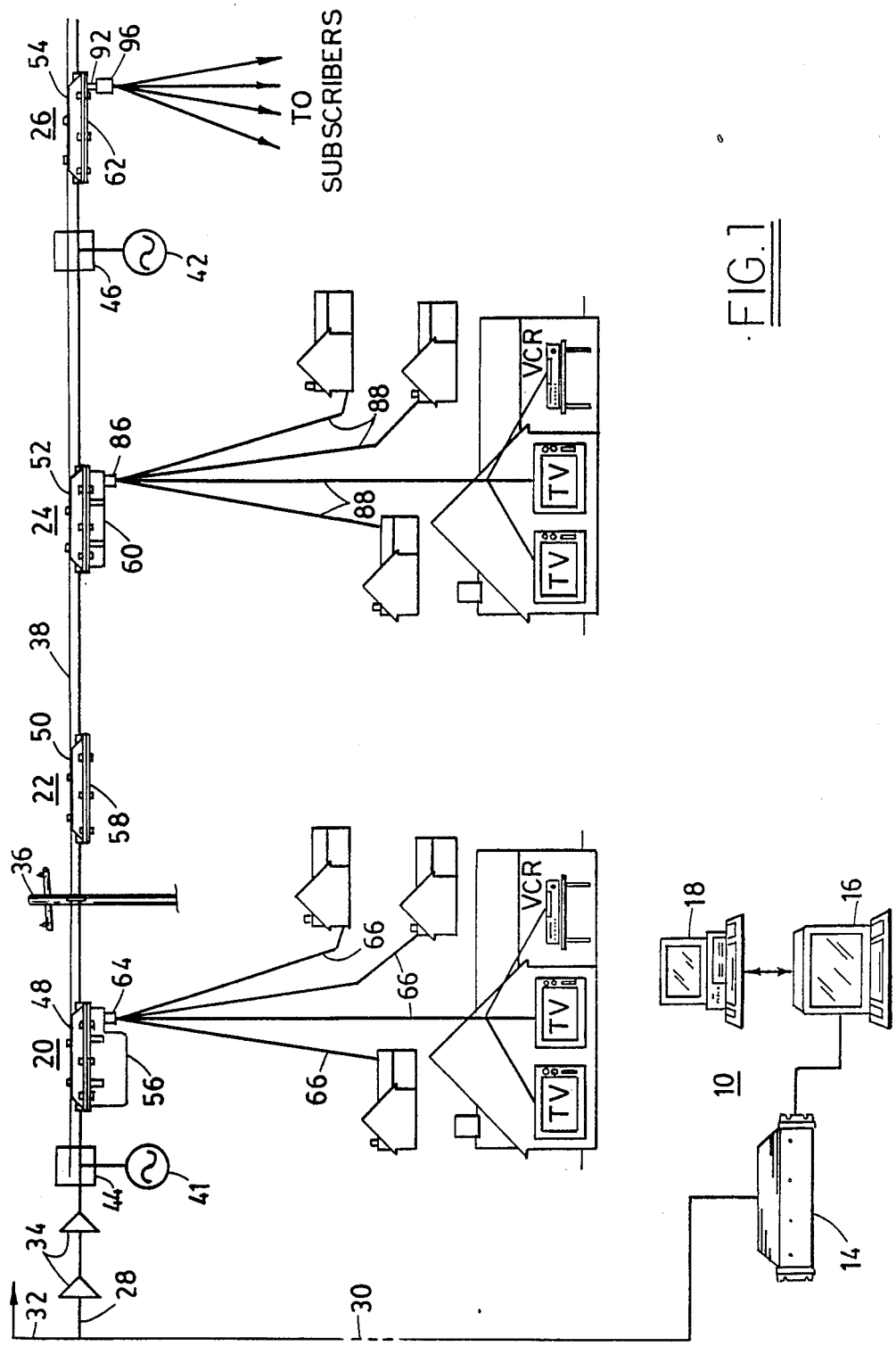
FIG. 1 is a schematic diagram of a CATV distribution system embodying the invention.
Figure 2:
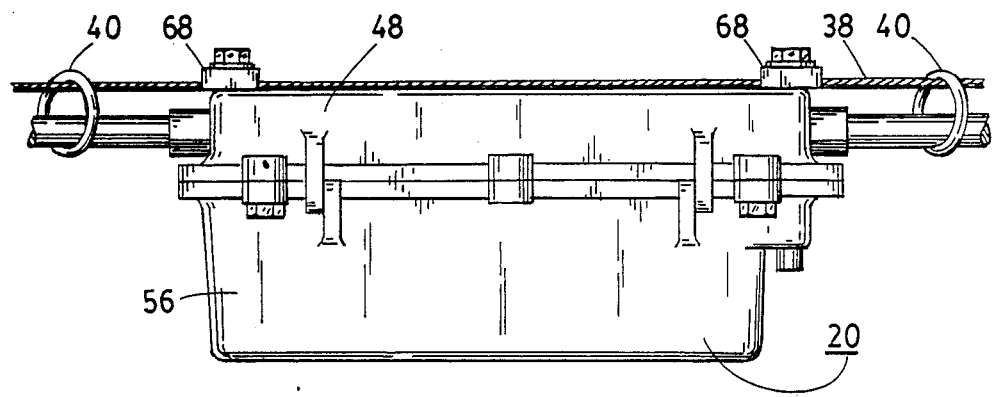
FIG. 2 is a view in elevation showing in greater detail the mounting of the housing of an off premises unit aerially with the cable.

Referring to FIG. 1, there is shown a CATV signal distribution system having a head end 10 at which is located an addressable transmitter 14 which generates broad band CATV signals (e.g. from 50 to 550 MHz). Addressing to provide different levels of service is obtained with a computer system including a system manager computer 16 and a billing computer 18. The system manager is compatible with common modes of pay per view which provides address information to subscriber control units via the cable. One such control unit 20 is shown by way of illustration in FIG. 1 as representative of one of four different types of units 22, 24 and 26 which afford different levels of service to subscribers. The cable 28 is shown connected to the transmitter 14. The cable may be long and have other distribution lines branching off the cable. These lines or cable runs may be connected directly to the transmitter 14 or to a hub of the distribution system (not shown). The dash lines 30 represent that the cable may be quite long. The branch 32 represents other branches than the illustrated branch containing the cable 28. Line extender amplifiers 34 may be connected in the cable. The cable 28 is mounted above ground, for example, on telephone poles, one of which 36 is illustrated in FIG. 1. This is referred to as an aerial mount. A strand 38 is attached to the poles and the cable is suspended from the strand. The strand 38 and rings 40 for suspending the cable on opposite sides of the unit 20 are shown in FIG. 2.

Power is inserted for operating the control unit by connecting AC power supplies, two of which 41 and 42 are illustrated, to the cable via power inserters 44 and 46. The power supplied may, for example, be 60 Hz AC at a voltage level of 40 volts RMS. Power from the cable may also be used to power the amplifiers 34. Only the subscriber control unit 20 contains active devices requiring power in the schematic diagram of FIG. 1.

The cable 28 passes in proximity to the premises of subscribers which are illustrated diagramatically by houses or by lines labelled "to Subscribers." The unit 22 is in proximity to the premises of subscribers who have not subscribed for cable services. These potential subscribers can readily be connected without disconnection of any equipment in the unit 22 from the cable 28.

Each of the units 20, 22, 24 and 26 has a different type of housing with covers 48, 50, 52 and 54 and enclosure units 56, 58, 60 and 62. The covers 48, 50, 52 and 54 and the equipment contained therein are common, identical equipment. The enclosures 56, 58, 60 and 62 are different. Connectors 64 from the control unit enclosure 56 are connected by way of drops 66 to the homes of 4 subscribers which may be equipped with one or more television sets and video cassette recorders (VCRs). Since the addressing and level of service is remotely controlled from the head end 10, electronics that are physically located in the subscriber's home (e.g. set top converters (addressable or nonaddressable)) are not required. The enclosure unit 56 is larger than the other enclosures 58, 60 and 62 in order to accommodate interdiction electronics which deny the transmission of selected channels to selected subscribers in accordance with address signals generated by the system manager 16.

The covers of each of the units 20, 22, 24 and 26 has connected thereto strand clamps 68 (see FIG. 2) which attach the unit to the strand 38 and provide aerial mounting. Other configurations of the system may have the cable underground, in which case access to the cable is via hollow bases 70 of pedestals 72 having posts 74 (see FIG. 9). An off-premises subscriber control unit 76 similar to the unit 20 is used, which is identical except for the orientation of a cable seizure board in the cover 78 thereof. The unit 76 receives the incoming and outgoing ends of the cable 28. It is mounted on the post as by bolts 80 which are screwed into the cover 78 at the strand clamps 68 (not shown in FIG. 9). It will be appreciated that the post, which may be rectangular or circular member, desirably has slots for receiving the strand clamps into which the bolts 80 may extend or from which ties may extend encompassing the posts 74.

Figure 15:
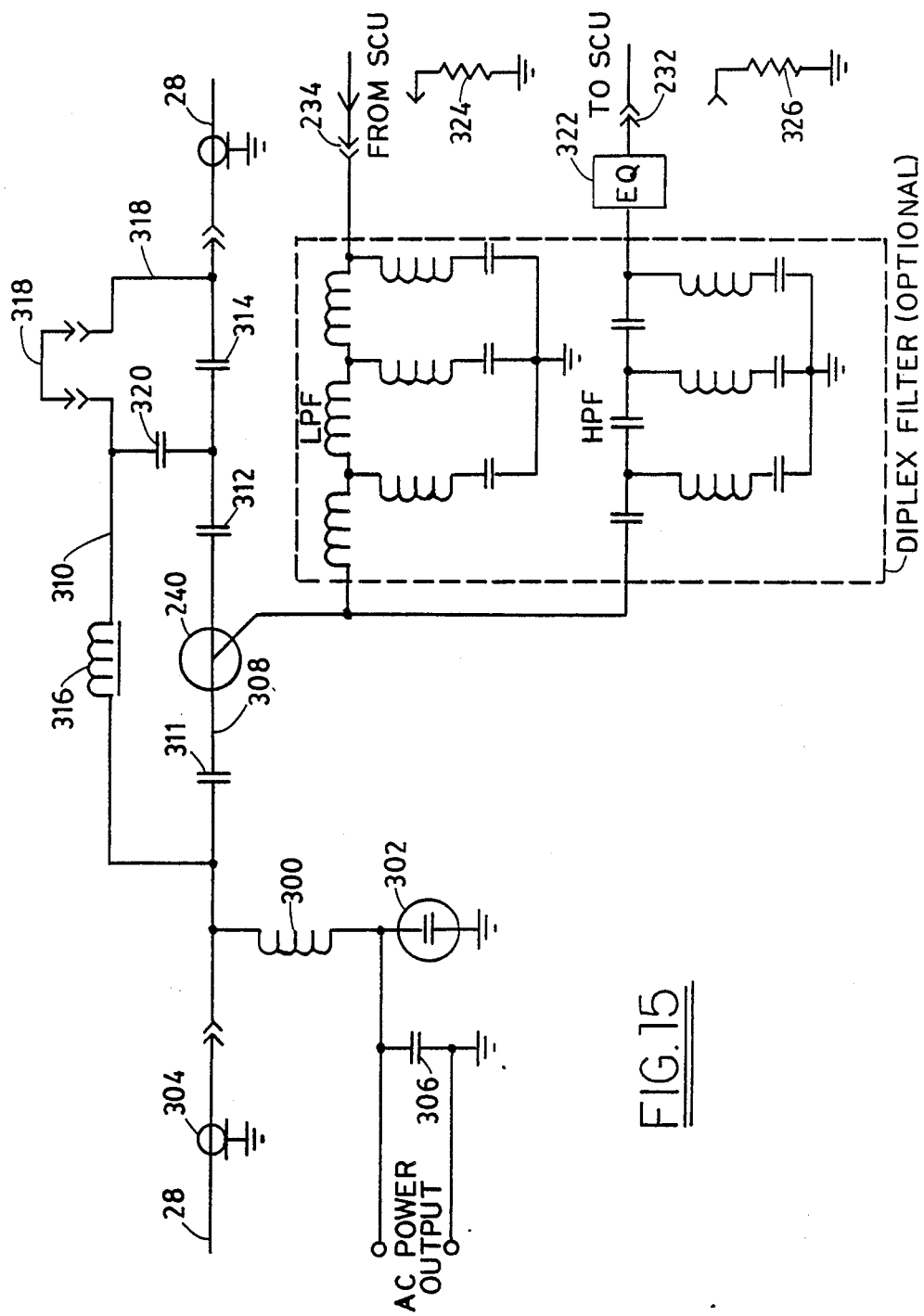
FIG. 15 is a schematic diagram illustrating the electronic equipment on the seizure board and showing the power current bypass circuit.

The unit 22 (FIG. 1) is at no service locations, and has as its enclosure, a plate connected to the cover 50. The cover 50 contains tapping electronic circuits which are common to tapping circuits in the covers of the other units 20, 24 and 26. These tapping circuits are on boards called seizure boards 84 illustrated in FIGS. 5 and 6. The circuitry on the seizure board is illustrated in FIG. 15. In the case of the tapping circuitry in the no-service unit 22, the circuitry is terminated so that losses are presented electrically simulating the losses which would have been presented to the cable by actual subscribers.

The enclosure 60 of the unit 24 contains signal splitting circuits and may contain band rejection filters which deny certain channels to subscribers connected to connectors 86 via drops 88. The circuitry may be on band rejection filter boards 90 (see FIG. 12 and 14). The circuitry of such boards is illustrated schematically in FIG. 16. It will be noted that the size of the enclosure 60 is smaller than that of the enclosure 56 of the subscriber control unit 20. Both the filter board circuitry in the enclosure 60 of the unit 24 and the addressable interdiction circuitry of the subscriber control unit 20 in its enclosure 56 Provide means for controlling signals distributed to subscribers in accordance with the level of service to which they have subscribed.

The unit 26 is substantially the same as the unit 22. It is shown in greater detail in FIG. 11. The enclosure 62 is a plate which has four holes along one edge from which connectors 92 extend. These may be screw type (so-called F) connectors which receive passive band reject filters 96 contained in circular housings. The filters and their housings are therefore supported by the plate 62 which provides the enclosure for the cover 54. Under the plate, there is mounted a printed circuit board 94 containing splitter circuitry. This splitter circuitry is connected to the tapping circuits in the cover 54 by way of a lead such as the lead 98 used in the addressable control unit 20 (see FIGS. 5 and 6). The filters 96 are commercially available, for example, from Pico of Syracuse, New York, as well as from other manufacturers serving the CATV industry.

It will be apparent that the invention provides a distribution system which provides different levels of service and is adapted to use different technologies for controlling the signals distributed to subscribers. There is also a high degree of commonality and maintainability. For example, when a potential subscriber having premises near the no-service unit 22 orders connection to the cable, it is a simple matter to remove the enclosure plate 58 and substitute another enclosure with the requisite electronics to afford the level of service ordered by the new subscriber. Since the tapping circuitry in the covers remain in place, service to subscribers downstream of the new subscriber is not affected.

Figure 3:
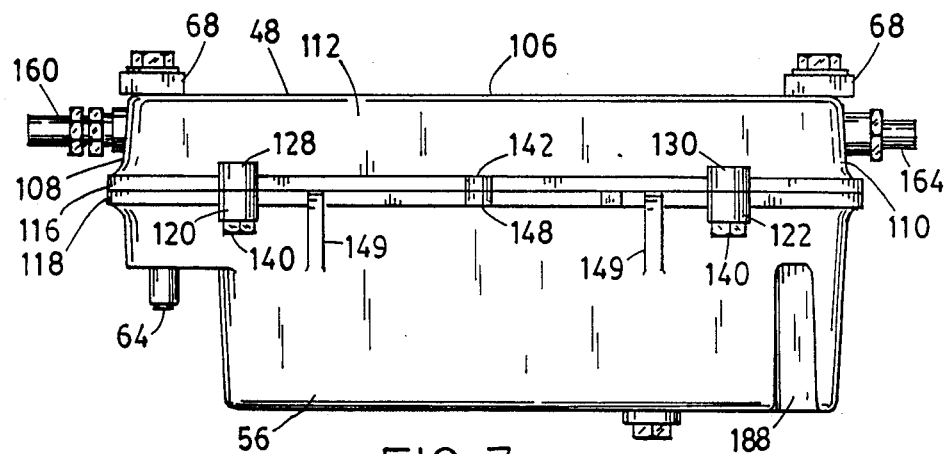
FIG. 3 is a elevational view showing the housing in greater detail.
Figure 4:
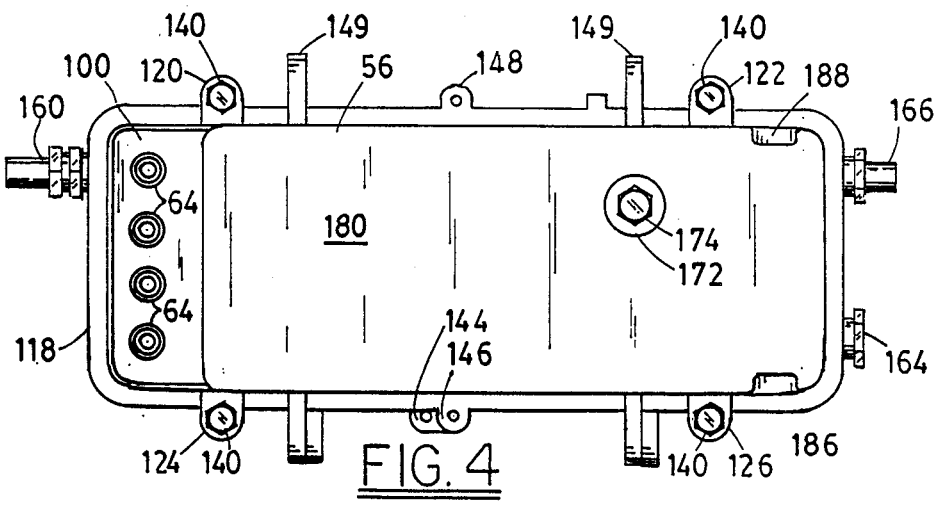
FIG. 4 is a bottom view showing the housing.

Referring to FIGS. 3 and 4, there is shown the housing of the subscriber unit 20 with its cover 48 and enclosure unit 56. Both the cover 48 and the enclosure unit 56 are preferably castings of aluminum. These castings may be covered with a coating, for example, of epoxy for greater weather resistance if required. Instead of an aluminum casting, the housing parts 48 and 56 may be molded from any suitable (environmentally stable) plastic such as polypropylene.

Both the cover 48 and the enclosure 56 are generally rectangular. The enclosure 56 has a step 100 which is drilled with four holes in which the RF connectors 64 are mounted. These may be so-called F type connectors and have pins (not shown) which enter into plugs 102 in the reduced diameter ends of subscriber modules 104 (see FIGS. 5 and 6). The signals, processed in the subscriber modules to deny premium channels which are not subscribed for, are extracted via the plugs 102 and connectors 64 and supplied via the drop 66 (FIG. 1) to the subscribers.

Figure 5:
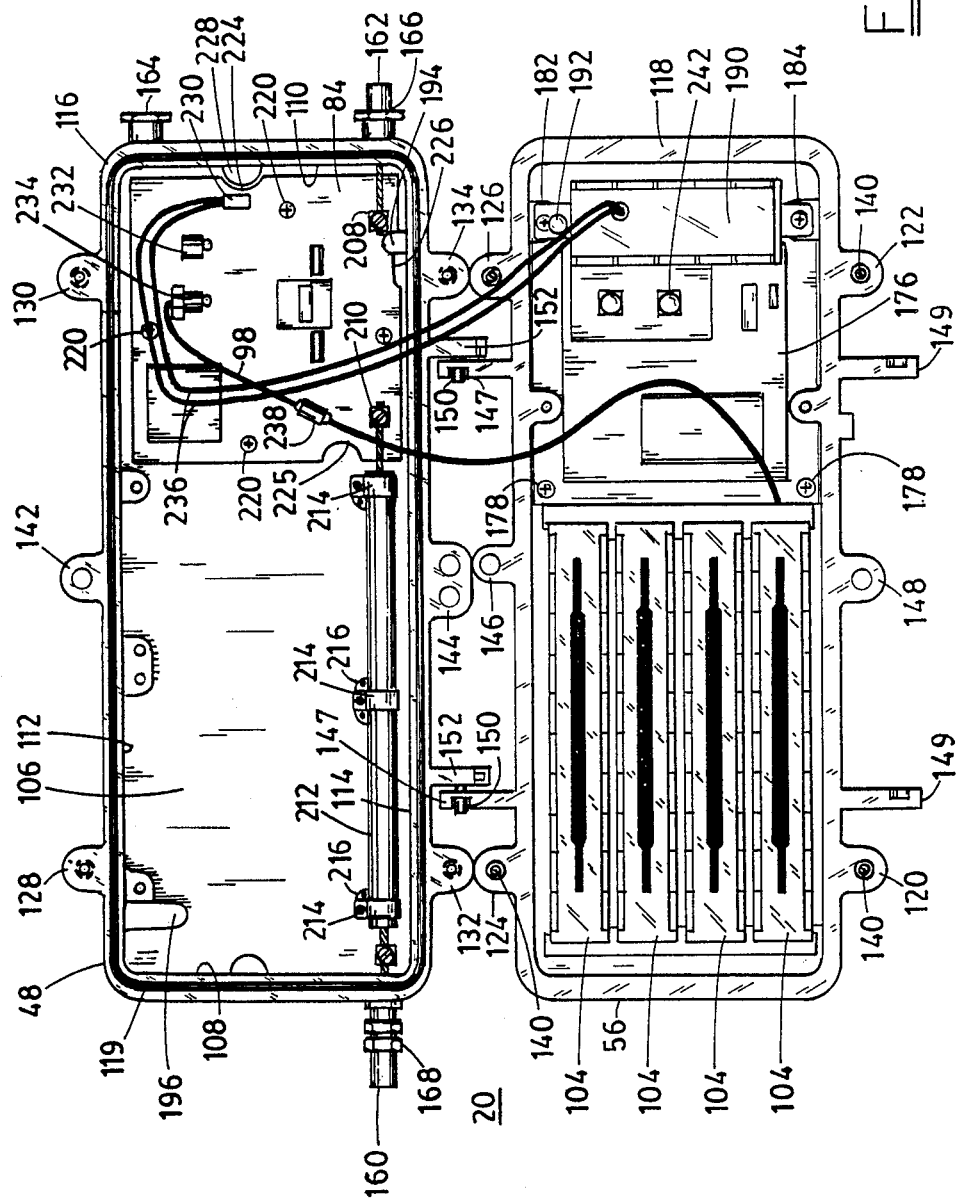
FIG. 5 is a plan view showing the unit illustrated in FIGS. 3 and 4 with cover open so as to display equipment therein.
Figure 6:
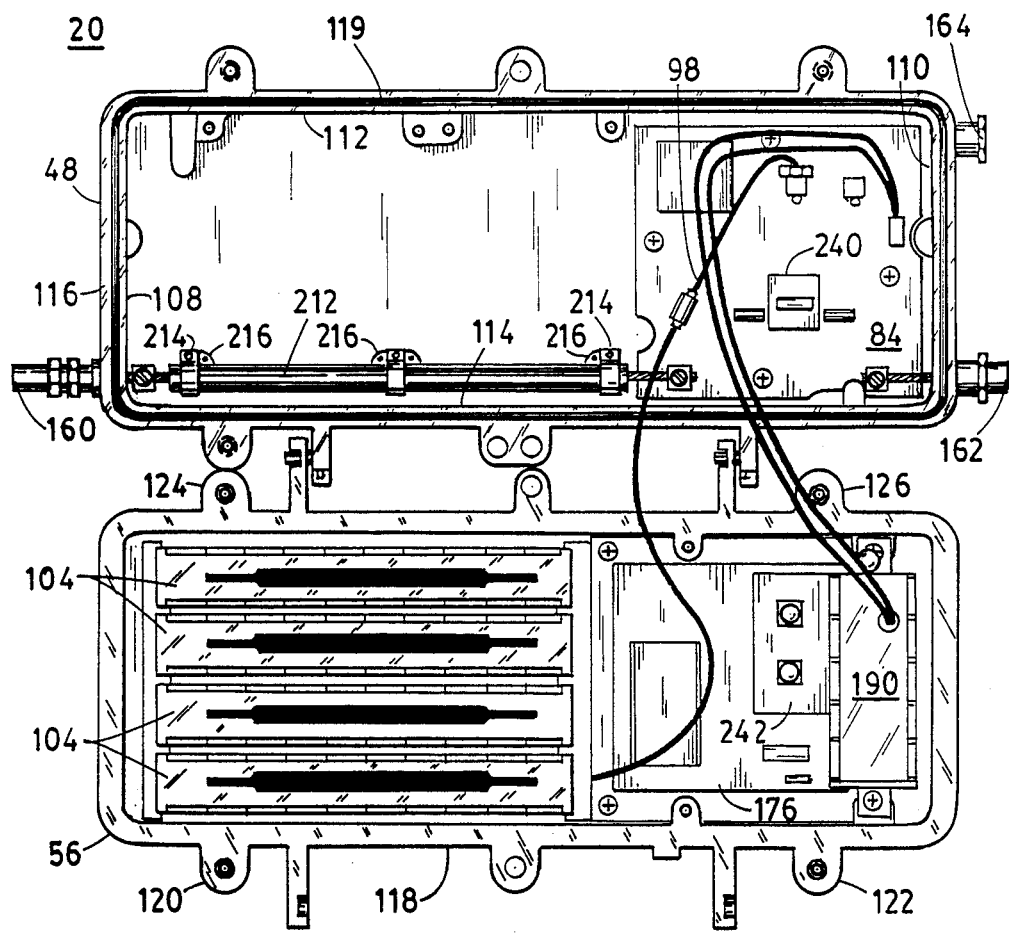
FIG. 6 is a view similar to FIG. 5 also showing, schematically one of the subscriber modules in the enclosure unit which provides the bottom of the housing.
Figure 6A:
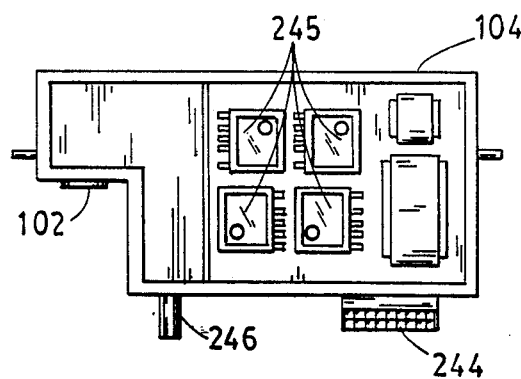
Figure 7:
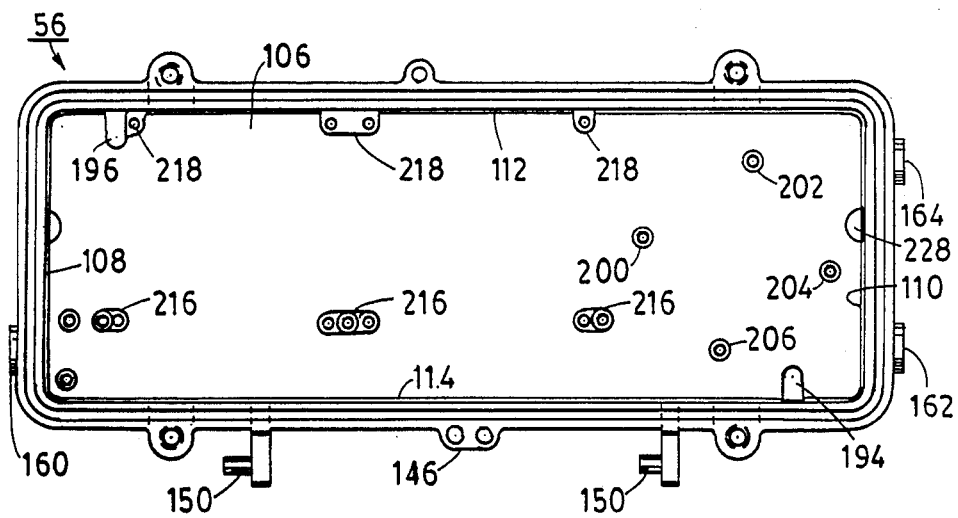
FIG. 7 is a plan view of the cover of the housing with the seizure board removed.

The cover 48 is generally rectangular and has a base 106, end walls 108 and 110 and side walls 112 and 114 (see also FIGS. 5 and 6). A flange 116 extends around the periphery of the cover 48. The inside surface of the flange has a groove containing an environmental gasket or seal 119. The flange 116 cooperates with a complementary flange 118. Tabs 120, 122, 124 and 126 extend outward from the flange 118 and cooperate with tabs 128, 130, 132 and 134. Threaded holes in the tabs 128, 130, 132 and 134 receive bolts 140 which fasten the cover 48 and the bottom enclosure 56 together. Other tabs 142, 144, 146 and 148 have holes which are adapted to receive wire loops which are sealed, say with lead seals or with locks so as to prevent tampering (unauthorized access) with the contents of the unit 20.

The enclosure 56 has ears 149 with slots and holes which are adapted to receive pins 150 extending from ears 152. The cover may be hinged to the opposite side of the enclosure by removing the pins 150 from the ears 147 and turning the cover clockwise around the enclosure. Then the pins 150 can be placed in the ears 149. Hinging on either side is available and which side is used depends upon the existence of structures which could interfere with the opening of the cover.

The cover has aligned cable feeder ports (ports A & B) 160 and 162 in opposite ends of the cover and a third cable feeder port 164 (Port C) in the same end of the cover as the port 162 (Port B). These ports are provided by holes drilled in the end walls 108 and 110 in which receptacles 166 (see FIG. 5) for connectors are inserted. These receptacles receive screw-on connectors 168 to which the incoming and outgoing ends of a cable are connected. Different types of connectors are shown at 166 and 168.

In other words, there are gaps in the cable where the units 20, 22, 24 and 26 (FIG. 1) are inserted. The A and B ports 160 and 162 are used when the housing is aerial mounted. The B and C ports 162 and 164 are used for pedestal mounting. Connectors are installed in the two ports which are used; the unused port is plugged. Such a plug is shown in port 164 in FIG. 5. The connections of the incoming and outgoing cables to the ports for aerial mounting is shown in FIG. 2. It will be noted in FIG. 9 that drop cables 168 from the RF connectors 64 may be held by ties 170 which extend through the tabs 144 and 146.

As shown in FIG. 4 and also in FIG. 2, there is an access opening or diagnostic port 172 which is sealed by a plug 174. This port provides access to a connector on a mother board 176 which is located and attached by screws 178 on posts (not shown) in the base 180 of the enclosure or bottom 56.

Bosses 182 and 184, which appear as indentations 186 and 188 in the side walls of the enclosure 56, provide for the mounting of a power supply module 190 in the enclosure 56. Extending upwardly from the power supply module is a tamper indicator switch plunger 192. This plunger is depressed by a boss 194 along the inside of the side wall 114. A boss 196 extending from the opposite side wall 112 provides the function of depressing the plunger 182 when the cover 56 is hinged on the ears 149. The circuitry which may be located on the mother board 176 is designed to disable the unit 20 whenever the cover is opened without authority. A signal may be transmitted along the cable and addressed to the unit 20 to inhibit disabling of the unit when a technician, authorized by the cable operator (the CATV company), opens the unit.

Figure 8:
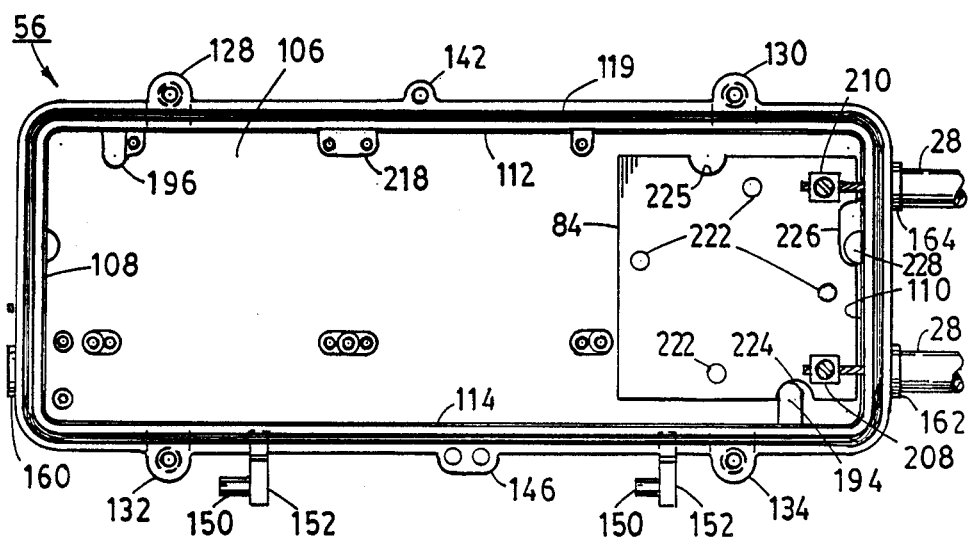
FIG. 8 is a view similar to FIG. 7 but with the seizure board in place and connected to cables extending through ports at one end of the cover.

The cover is shown in configuration for aerial mounting in FIGS. 5 and 6 and for pedestal mounting in FIG. 8. Adjacent the wall 110 are four posts 200, 202, 204 and 206, which are arranged along a circle 90° apart. These posts have blind, threaded screw holes. On these posts there is mounted a rectilinear (generally square) printed circuit board having metal blocks 208 and 210 attached thereto and connected to the circuit patterns thereon. These blocks provide terminals which seize the ends of the cable and have holes which cross at the center thereof into which the central conductors of the cable extend. The center conductors are clamped by set screws to the block so that the incoming and outgoing cables are connected to the board 84. The board is therefore referred to as a seizure board and the blocks 208 and 210 as seizure blocks.

The seizure blocks 208 and 210 are disposed along one edge of the board and are spaced from each other so as to be aligned with the cable entering feeder cable port A indicated at 162 and a section 212 of coaxial cable. This section is attached by ties 214 which are screwed into bosses 216 (see also FIG. 6) on the base 106 of the cover 56. It will be noted that the cover has other bosses 218 extending from the corner between the base and the side wall 112 which may be used for attachment of other printed circuit boards, but may be omitted if desired. The seizure board 84 is connected to the posts 200 by screws 220 which extend into the threaded holes in the posts 200, 202, 204 and 206. These screws extend through holes 222 in the board which are placed so as not to interfere with the circuit patterns on the board 84.

There are also notches 224, 225 and 226 in the edge of the board along which the seizure blocks 208 and 210 are spaced and along the edges of the board perpendicular to that edge. These notches are spaced complementary to the boss 194 and another boss 228 which extend from the side wall 114 and the end wall 110 of the cover 56. The mounting on the posts 200, 202 and 206 and the notches, 224, 225 and 226 and the bosses 194 and 228 allow the seizure board 84 to be located either in the position shown in FIGS. 5 and 6 for aerial mounting or in the position shown in FIG. 8 for pedestal mounting of the housing. No other orientation of the board is permitted because there will be interference with the bosses 194 and 228. When pedestal mounting is used, the section 212 of coaxial cable is desirably removed from the cover 56.

The seizure board has connectors 230, 232 and 234. The connector 230 may be a modular or snap-on plug type for wires 236 which carry AC power routed along the cable 28 to the power supply module 190. The power supply module 190 generates heat in converting the AC power to DC power for operating the addressable modules 104 and the circuits on the mother board 176. The bosses 182 and 184 are disposed in thermal contact with the module 190 so that the enclosure 56 provides a thermal radiator for heat generated in the module 190.

The connector 232 is an RF connector for the lead 98 for the CATV signal. This lead 98 connects the CATV signal which is tapped from the cable by the seizure board, and particularly by a directional coupler 240, to the subscriber modules 104. Address signals on the cable are derived from the CATV signal by a data receiver 242. The connector 234 is an audio type connector which is not shown as being connected but is useful when interactive operation is desired. Then, signals from the subscriber, for example, for ordering a particular premium program on a premium channel (impulse pay per view or IPPV service) is provided.

The control unit 20 contains circuitry in its subscriber modules 104 and its mother board 176 for denying unauthorized channels by interdiction. This is accomplished with the subscriber module by injection of a jamming carrier before the output connectors 64 to the drop cables 66 (FIG. 1). The jamming obliterates the video of the deauthorized channels, effectively denying their use. Specifically, the unauthorized channels are denied by injecting the jamming carrier within the channel's band width. The jamming carriers are generated by four frequency-agile voltage-controlled oscillators (VCO's) 245 (see FIG. 6). Each VCO hops to and dwells at jamming frequencies within an adjacent band of the CATV band width. The period of time a jamming frequency is maintained is the dwell time. The carrier may be slewed in frequency while dwelling, for even greater security.

The addressing signals are received by the data receiver 242 and connected via the mother board to the subscriber modules together with power by way of edge connectors 244. The RF signal is provided by an RF connector 246 which may be connected to a connector on the mother board. The mother board also has circuits for splitting the CATV signal among the four subscriber modules. An automatic gain controlled amplifier may also be part of the circuitry on the mother board which feeds the CATV signals from the lead 236 to the splitter.

The interdiction system used in the unit 20 may be of the type described in U.S. Patent Application Ser. No. 166,302 filed Mar. 10, 1988 in the names of Lamar E. West, Jr., Christopher Plonsky, James O. Farmer, and David P. Durand, and entitled "Off-Premises Cable Television Channel Interdiction Method and Apparatus", which application is assigned to the same assignee as the present application.

Other technologies such as band reject filters (negative traps) which remove energy at and around the frequency of the picture carrier of the channels to be denied or which use positive traps for removing interfering signals inserted in the channels to be controlled at the CATV head end, may alternatively be contained in one or more of the subscriber modules 104. The positive trap system may be of the type described in Farmer et al., U.S. Pat. No. 4,748,667 issued May 31, 1988 and entitled "Jamming Signal Scrambling and Descrambling Systems for CATV".

Referring to FIG. 10, there is shown an enlarged view of the no-service unit which is located in proximity to the premises of potential subscribers. The cover 50 may be identical to the cover 48 described in connection with FIGS. 3 through 6 for aerial mounting. For pedestal mounting, only the seizure board need be rotated and connections made to the B and C ports 162, 164.

Figure 9:
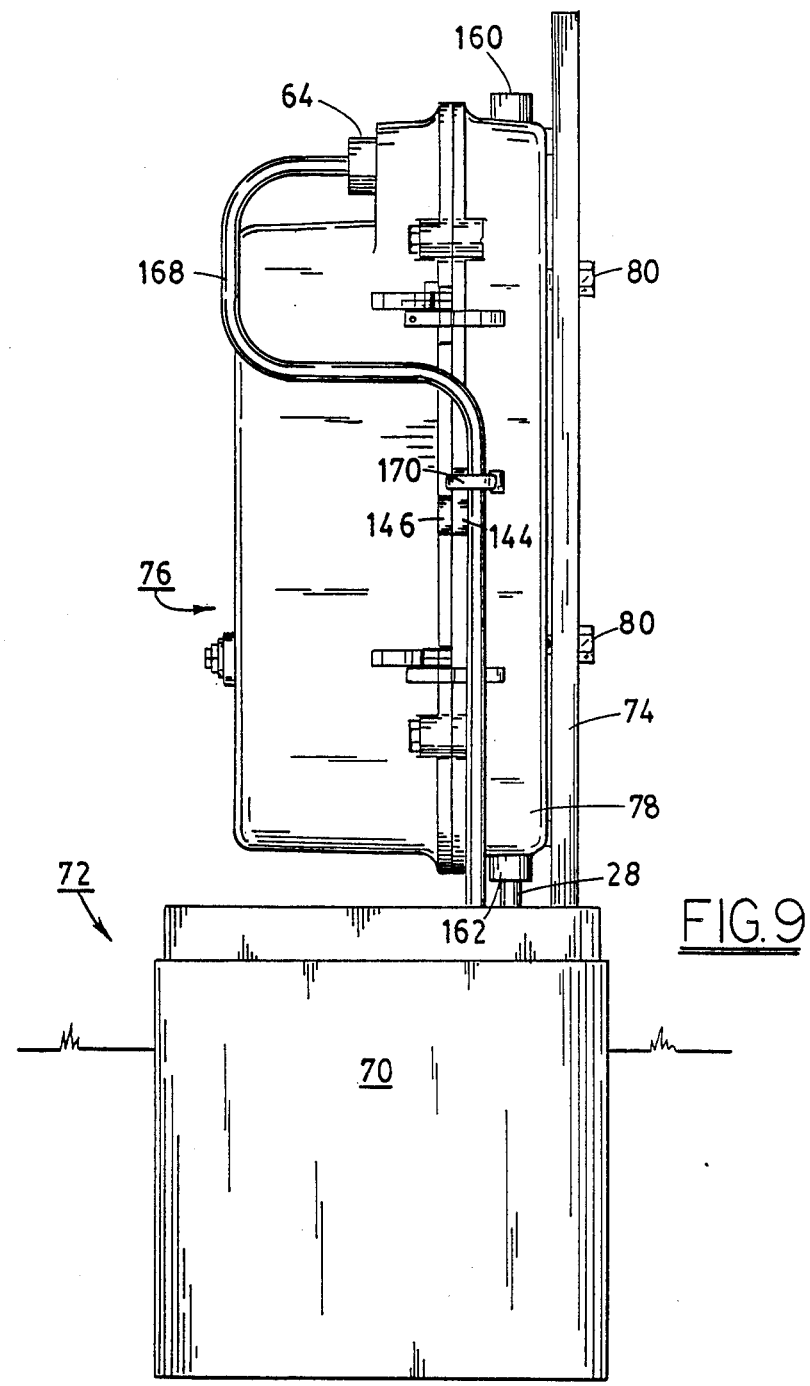
FIG. 9 is a view in elevation showing the housing illustrated in FIG. 8 mounted on a pedestal.

FIG. 11 illustrates the unit 26 which again uses a cover 54 which may be identical to the cover described in connection with FIGS. 3 through 6 for aerial mounting and FIG. 9 for pedestal mounting. FIG. 11 shows a splitter board attached to the plate 62 which encloses the cover and a representative band reject filter or negative trap for a channel to be denied which is screwed into an RF connector located in a hole in the plate 62.

Figure 14:
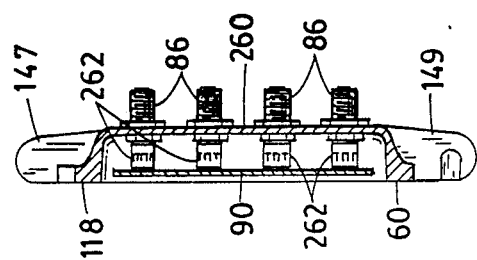
FIG. 14 is a sectional view of the enclosure shown in FIG. 12, the section being taken along the line 14—14 in FIG. 12.
Figure 12:
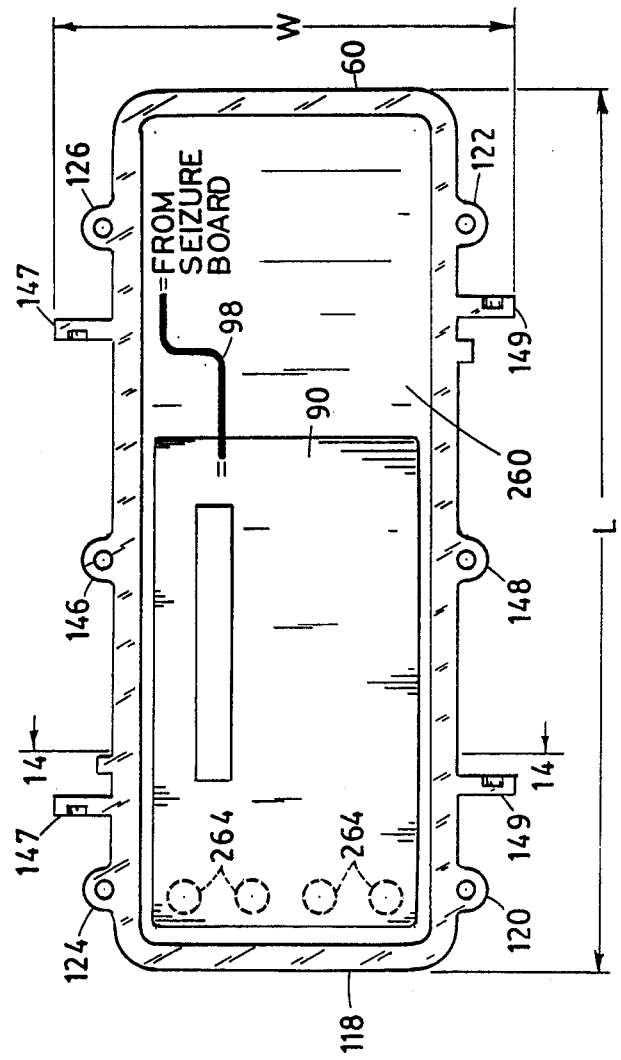
FIG. 12 is a plan view of the bottom or enclosure unit of another of the housings illustrated in FIG. 1.
Figure 13:
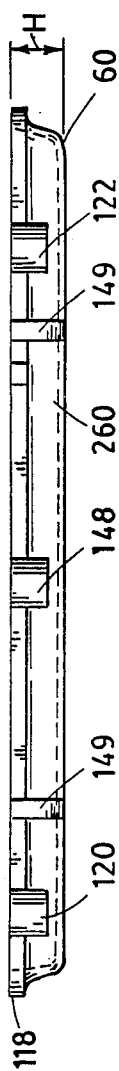
FIG. 13 is an elevational view of the enclosure unit shown in FIG. 12.

FIGS. 12, 13 and 14 illustrate the enclosure unit or housing bottom 60 of the unit 24 (FIG. 1). The enclosure 60 is in the form of a shallow rectangular pan having hinge pin receiving ears, locking tabs and a flange of configurations similar to those of the enclosure 56. These parts are indicated with the same reference numerals as used for the enclosure 56. The RF lead 98 carries CATV signals to an RF connector (not shown) on the band reject filter board 90. This board may be mounted by screws extending into posts (both not shown) in the base 260 of the enclosure 60. RF output connectors 86 have ends which receive snap on caps 262 extending from the bottom of the board 90. The connectors 86 themselves extend through holes 264 in the base 260.

Figure 16:
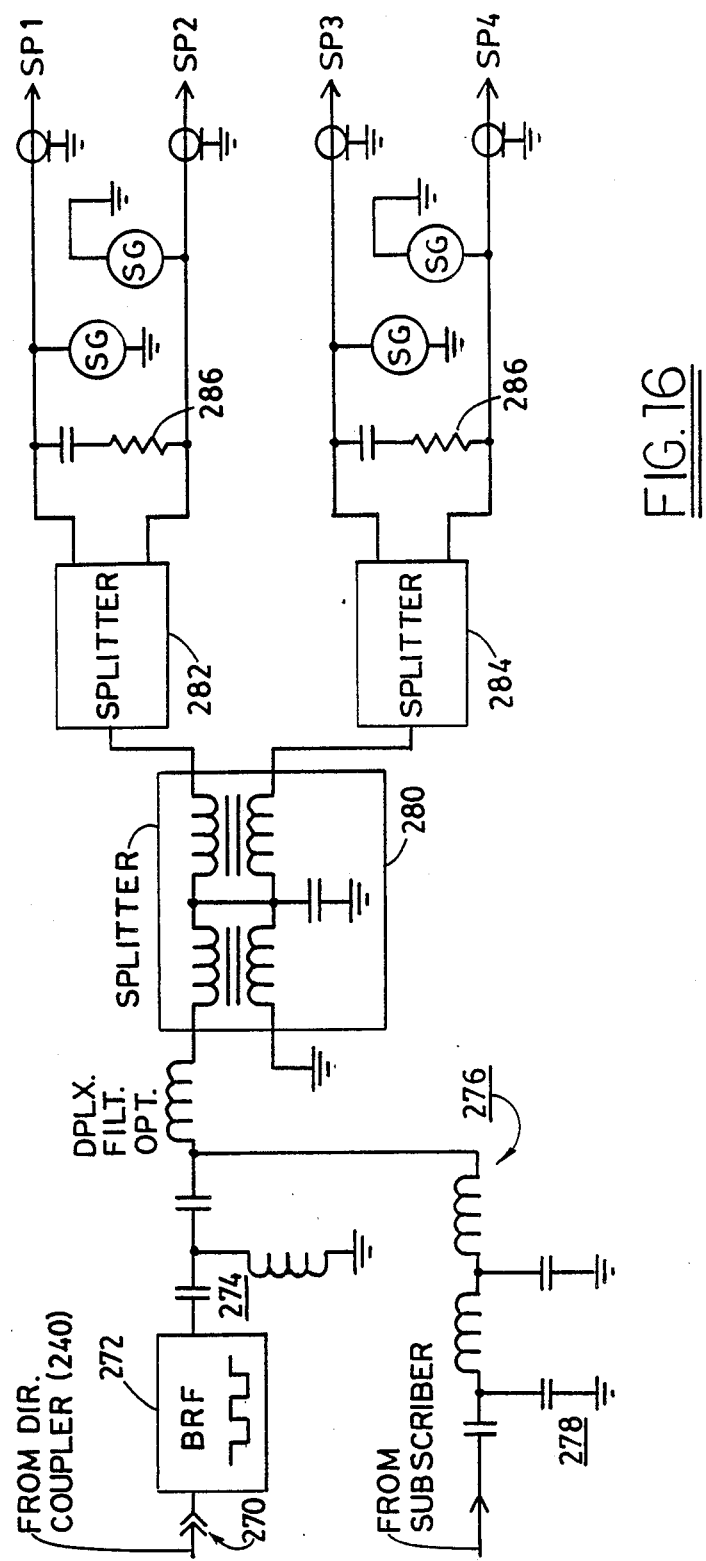
FIG. 16 is a schematic diagram of circuitry on the band reject filter and splitter board shown in FIG. 12.

The circuitry on the board 90 is illustrated in FIG. 16. The CATV signal extracted by the directional coupler 240 (FIGS. 5 and 6) is applied via the RF connector 270 to a band reject filter (BRF) 272. This band reject filter may be designed to reject a band around the carriers of channels to be denied. One or more channels may be denied. These channels are denied to all of the subscribers which are fed by the unit 24. The output from the BRF is passed through a high-pass section 274 of an optional diplex filter 276. The low-pass section 278 of this filter may be signals provided by the subscriber which are transmitted back to the cable.

The CATV signals are then applied to a cascade of two-way splitters 280, 282 and 284. These splitters are ferrite core, hybrid transformers with capacitors connected to taps between the windings thereof for return loss correction at high frequencies. The final splitters 282 and 284 provide the subscriber output signals SP1, SP2, SP3 and SP4. Each output line is protected by a spark gap device against lightning and other transients (the spark gap devices are indicated at SG). Resistors 286 desirably of value twice that of the cable drops (150 ohms where the cable drops are 75 ohm lines) are connected across the splitters 282 and 284 for phase correction to compensate for different loads (different signal levels) which are presented by the subscriber equipment; in other words, to dissipate power when unbalanced impedances exist between the subscriber ports SP1 and SP2 and the subscriber ports SP3 and SP4.

Referring to FIG. 15, there is shown the circuitry on the seizure board 84. This circuitry is connected between the incoming and outgoing ends of the cable (viz., across the gap) in the cable here the subscriber control units 20, 22, 24 and 26 (FIG. 1) are located. An RF choke 300 and a gas discharge tube 302, which provides a protective device against lightning or other high voltage transients is connected across the cable; that is, between the cable center conductor and ground which is the potential of the cable sheath indicated schematically at 304. A capacitor 306 is connected in series with the choke so that the choke does not present an open termination which might adversely affect the transmission of the CATV band along the cable. The inductance of the choke 300 and the capacitor 306 are such that there is no resonance or anti-resonance at any frequency in or near the CATV band.

There is an RF path 308 which is bypassed by a power current path 310. The RF path includes the directional coupler 240 in series with two capacitors 310 and 312 and another capacitor 314. All of these capacitors are of high value. For example, of about 0.1 microfarads and are essentially transparent to RF signals in the CATV band. The power current is routed across the RF path by an RF choke 316, for example, of from 10 to 50 microhenries, which is connected through a switching device, which in a preferred embodiment is a removable jumper 318. This jumper is connected across the capacitor 314 either directly by a pair of leads at least one of which 318 provides a direct current path for the RF power current. The other connection may be via a capacitor 320 which may of like value to the capacitors in the RF path 308 so as to be essentially transparent to RF in the CATV band. The capacitor 320, or a direct connection which may be used in lieu of the capacitor 320, provides a termination for the choke whether or not the jumper is switched in or pulled out to respectively close or open the power current path. This circuit insures that the choke is terminated by an impedance which together with the inductance of the choke and its inherent capacitance is not in anti-resonance with any of the other circuit components to which it is connected at any frequency in or near the CATV band. An open termination which can cause reflection of the CATV signal, and therefore ghosts in the picture which is viewed by subscribers, or reduction in CATV signal energy is avoided.

In order to determine whether the switching jumper should be inserted or removed the cable operator refers to a so-called strand map which shows the voltage level available at different locations along the cable. The jumper is removed at the last subscriber control unit (the unit most distant) from the power supply at which sufficient operating voltage is available from that supply. Then interference (bucking of AC signals from different power supplies) is avoided.

The directional coupler 240 may be connected via an optional diplex filter having low-pass and high-pass filter sections (LPF and HPF, respectively). The LPF section receives signals for ordering premium programs from the subscribers. The high-pass filter is connected by way of an equalizer 322 which is desirably a plug-in equalizer for compensating for any tilt in the spectral response of the system at the input to the subscriber equipment. The subscriber equipment will be the addressable module when an addressable subscriber control unit, such as the unit 20 (FIG. 1) is used.

When the tapping circuit shown in FIG. 15 is used in a cover at a no-service location, terminating resistors 324 and 326 are connected to the outputs at the equalizer and to the input to the LPF where a diplex filter is used. The connectors 232 and 234 (FIG. 5) are schematically illustrated in FIG. 15. The terminating resistors may be part of plugs which are inserted in these connectors when the circuit is at a no-service location. These terminations provide losses simulating actual subscriber installations so that signal transmission characteristics of the distribution system are essentially unaltered either with or without actual subscribers connected at all locations in the distribution system.

From the foregoing description it will be apparent that there has been provided an improved broad-band distribution system especially adapted for off-premises CATV applications, as well as equipment useful therein. Variations and modifications in the herein-described system and the equipment, within the scope of the invention, will undoubtedly suggest themselves to those skilled in the art. Accordingly, the foregoing description should be taken as illustrative and not in a limiting sense.

We claim:

1. A CATV signal distribution system for distributing CATV signals to a plurality of premises where subscribers have subscribed for different levels of service and where potential subscribers are located, said system comprising a cable which traverses a path in proximity to said premises, means for propagating said CATV signal along said cable, said cable having a plurality of gaps adjacent different ones of said plurality of locations, a plurality means for tapping said signal from said cable located connected to said cable in different ones of said plurality of gaps, a plurality of housings each having a cover, said tapping means being disposed entirely in said cover, a plurality of different enclosure units which close said cover when attached thereto, means for controlling the signals distributed to subscribers in accordance with the levels of service to which they have subscribed contained in certain of said units; said certain units being attached to said cover to constitute certain of said housings, said tapping means being connected in CATV signal communication relationship with said controlling means in said certain housings, others of said units being plates which close said cover when attached thereto, said plates being attached to said covers to constitute others of said plurality of housings, means for electrically terminating said tapping means connection to said tapping means in the covers of said others of said plurality of housings, said certain of said plurality of housings being disposed along said cable in the proximity of the premises having the subscribers for different levels of service and said others of said plurality of housings being disposed along said cable in the proximity of the premises of the potential subscribers.

2. The system according to claim 1 wherein said certain units have a plurality of external connectors for cables leading into different ones of a group of said plurality of said premises which group of premises is in proximity to said certain of said plurality of housings.

3. The system according to claim 2 wherein said certain of said enclosure units consist of a plurality of types respectively characterized by means operating in accordance with different technologies for providing said controlling means contained therein.

4. The system according to claim 3 wherein said enclosure units include units of a first type and said means operating comprises means for interdicting the transmission of said CATV signals on channels related in accordance with control signals transmitted along said cable.

5. The system according to claim 4 wherein said first enclosure unit is larger in size than others of said plurality of enclosure units.

6. The system according to claim 4 wherein said interdicting means comprises a plurality of oscillators for generating and supplying signals for jamming said selected channels.

7. The system according to claim 2 wherein said enclosure units include units of a second type wherein said controlling means comprises means for rejecting at least one frequency band containing channels to which said group of subscribers have not subscribed, and means connected to said rejecting means for splitting said CATV signal passed by said rejecting means among said group of subscribers.

8. The system according to claim 1 wherein at least one of said other of said controller units supports means connected to said tapping means in the cover of its said housing for splitting said CATV signals among a group of plurality of subscribers in premises in proximity to said housing.

9. The system according to claim 8 further comprising band reject filters for preventing the passage of at least one channel to the said CATV channels to at least one of a said group of subscribers attached to said plate externally of said housing.

10. The system according to claim 1 wherein said cover of each of said plurality of housings is generally rectangular with sides and opposite ends, a first cable port on one of said ends a second cable port aligned with said one cable port on the other of said opposite ends and a third cable port on said other of said opposite ends, said first and second ports being adapted to receive ends of said cable on opposite sides of said gap when said housing is aerial mounted and said second and third ports being adapted to receive ends of said cable on opposite sides of said gap when said housing is pedestal mounted.

11. The system according to claim 10 wherein, said cable has a conductor, said tapping means comprises a printed circuit board having an edge, a pair of seizure blocks, spaced from each other along said edge, said seizure blocks each having a hole therein for receiving the conductor, a section of cable disposed in said cover, and having opposite ends aligned with said first and second ports respectively, means for providing a connection through said first port to said section at the one of the opposite ends thereof aligned with said first port and means mounting said board so that said seizure blocks are alignable in a first position thereof with said first and second ports to receive the conductor of said cable extending through said second port and the one of the opposite ends of said section which is aligned with said second port and in a second position thereof with the conductors of said cable which are aligned with said second and third ports.

12. The system according to claim 11 wherein said section of cable is disposed adjacent and along one of the sides of said cover.

13. The system according to claim 11 wherein said seizure blocks have crossed opening different ones of which receive the ends of said cables in said first and second positions, respectively.

14. The system according to claim 11 wherein said cover has a base from which said sides and ends thereof extend, said board being rectilinear, and such mounting means comprising posts extending from said base to which said board is connectable when said board is in said first and second positions, respectively.

15. The system according to claim 11 wherein said first and second positions are 90° displaced from each other.

16. The system according to claim 15 further comprising means including openings in said board and bosses extending from said cover for preventing mounting of said board except in said first and second positions.

17. The system according to claim 14 wherein said seizure blocks are disposed along one of the sides of said cover when said board is in said first position and along the end of said cover having said second and third ports when said board is in said second position.

18. The system according to claim 1 wherein said cover is generally rectangular and has a base, sides and ends, said cover base having an outside surface and an inside surface disposed between said sides and ends, means on said outside surface for attaching said cover and said housing to an above ground strand to provide for aerial mounting thereof.

19. The system according to claim 1 wherein said cover is generally rectangular and has a base, sides and ends, and means on said cover providing attachment of said cover and said housing to a vertical post for pedestal mounting thereof.

20. The system according to claim 1 wherein said cover and said enclosure units are generally rectangular, said cover having sides and ends and a base, a flange extending from said sides and base presenting a surface facing said enclosure, and means connecting said enclosure unit to said cover along said flange.

21. The system according to claim 20 further comprising a groove along said flange, a gasket in said groove for sealing said housing when said enclosure unit is connected to said housing.

22. The system according to claim 20 wherein said connecting means comprises hinge means extending from said flange and tabs having holes alignable with corresponding holes in said enclosure units for receiving bolts or screws.

23. The system according to claim 22 wherein at least one of said pair of alignable holes in said flange and enclosure unit is adopted to receive a lock or tamper resistant seal.

24. The system according to claim 1 wherein said cable carries power supplying current in addition to said CATV signals at high frequencies (RF) and said tapping means comprises means for providing first and second paths for said power supplying current and said high frequency CATV signals, respectively, means in said first path for blocking said high frequencies, and means in said second path for blocking said power supplying current, means for selectively opening and closing said first path to control the transmission of said power supplying current along said cable, and means connected across said opening and closing means for presenting a path for said high frequencies even when said opening and closing means is open thereby preventing reflections of RF signals or loss of RF energy in said first path.

25. The system according to claim 24 wherein said second path has a directional coupler in series therein and at least a first capacitor essentially transparent to said RF in series with said coupler, said second path having an RF choke in series therewith, said opening and closing means comprising a conductive element moveable into and out of said first path in series with said choke and at least a second capacitor essentially transparent to said RF connected in said second path across said conductive element when said element is moved into said first path.

26. The system according to claim 25 wherein said first capacitor and said second capacitor are connected to opposite sides of said coupler.

27. The system according to claim 26 wherein a third capacitor is connected between said coupler and said second capacitor, said moveable conductive element being connected to the junction of said second and third capacitors at one end of said element.

28. The system according to claim 27 wherein a fourth capacitor essentially transparent to RF is connected between said junction and said one end of said conductive element.

29. The system according to claim 24 wherein said first path is connected in bypassing relationship with said second path.

30. The system according to claim 25 wherein a plurality of power supplies providing said power supplying current are connected to said cable, said tapping means including means for tapping power current from said cable, said opening and closing means of being in open position to prevent power current from reaching said power current tapping means from more than one of said plurality of supplies.

31. The system according to claim 30 wherein said supplies are AC current power supplies.

32. The system according to claim 29 wherein said cable has a head end from which said CATV signals are provided, said tapping means has upstream and downstream ends respectively closer and further from said head end, a directional coupler for tapping RF signals propagating in a downstream direction, first, second and third capacitors essentially transparent to said RF in series with said coupler in said second path said first capacitor being connected between said upstream end and said coupler, said second and third capacitors being connected between said coupler and said downstream end, said second path having an RF choke and switching means connected in series, and said choke being connected to said downstream end and said switching means being connected across said third capacitor.

33. A housing for a tap which provides CATV signals from a cable having incoming and outgoing ends said housing comprising cover and a closure removably connected thereto, said cover being generally rectangular with sides and opposite ends, a first cable port on one of said ends, a second cable port aligned with said first cable port on the other of said opposite ends and a third cable port on said other of said opposite ends, means mounting said tap in said housing in first and second positions angularly displaced from each other, said first and second ports being adapted to receive said incoming and outgoing ends of said cable respectively when said housing is aerial mounted and said tap is in said first position, and said second and third ports being adapted to receive said incoming and outgoing ends of said cable respectively and said tap is in said second position when said housing is pedestal mounted.

34. The housing according to claim 33 wherein, said cable has a conductor, said tap comprises a printed circuit board having an edge, a pair of seizure blocks, spaced from each other along said edge, said seizure blocks each having a hole therein for receiving the conductor, a section of cable disposed in said cover, and having opposite ends aligned with said first and second ports respectively, means for providing a connection through said first port to said section at the one of the opposite ends thereof aligned with said first port, and means mounting said board so that said seizure blocks are alignable in a first position thereof with said first and second ports to receive the conductor of said cable extending through said second port and the one of the opposite ends of said section which is aligned with said second port and in a second position thereof with the conductors of said cable which are aligned with said second and third ports.

35. The housing according to claim 34 wherein said section of cable is disposed adjacent and along one of the sides of said cover.

36. The housing according to claim 34 wherein said seizure blocks have crossed openings different ones of which receive the ends of said cables in said first and second positions, respectively.

37. The housing according to claim 34 wherein said cover has a base from which said sides and ends thereof extend, said board being rectilinear, and such mounting means comprising ports extending from said base to which said board is connectable when said board is in said first and second positions, respectively.

38. The housing according to claim 34 wherein said first and second postion are 90° displaced from each other.

39. The housing according to claim 38 further comprising means including openings in said board and bosses extending from said cover for preventing mounting of said board except in said first and second positions.

40. The housing according to claim 37 wherein said seizure blocks are disposed along one of the sides of said cover when said board is in said first position and along the end of said cover having said second and third ports when said board is in said second position.

41. The housing according to claim 33 wherein said cover is generally rectangular and has a base, sides and ends, said cover base having an outside surface and an inside surface disposed between said sides and ends, means on said outside surface for attaching said cover and said housing to an above ground strand to provide for aerial mounting thereof.

42. The housing according to claim 33 wherein said cover is generally rectangular and has a base, sides and ends, and means on said cover providing attachment of said cover and said housing to a vertical post for pedestal mounting thereof.

43. The housing according to claim 33 wherein said cover and said closure is an enclosure unit and both are generally rectangular, said cover having sides and ends and a base, a flange extending from said sides and base presenting a surface facing said enclosure, and means connecting said unit to said cover along said flange.

44. The housing according to claim 43 further comprising a groove along said flange, a gasket in said groove for sealing said housing when said enclosure unit is connected to said housing when said enclosure unit is connected to said housing.

45. The housing according to claim 43 wherein said connecting means comprises hinge means extending from said flange and tabs having holes alignable with corresponding holes in said enclosure units for receiving bolts or screws.

46. The housing according to claim 45 wherein at least one of said pair of alignable holes in said flange and enclosure unit is adopted to receive a lock or tamper resistant seal.

47. In a system wherein a cable carries power supplying current in addition to CATV signals at high frequencies (RF) improved means operative upon said CATV signals and for routing said power supplying current which comprises means for providing first and second paths for said power supplying current and said high frequency CATV signals, respectively, means in said first path for blocking said high frequencies, and means in said second path for blocking said power supplying current, means for selectively opening and closing said first path to control the transmission of said power supplying current along said cable, and means connected across said opening and closing means for presenting a path for said high frequencies even when said opening and closing means is open thereby preventing reflections of RF signals or loss of RF energy in said first path.

48. The system according to claim 47 wherein said second path has a directional coupler in series therein and at least a first capacitor essentially transparent to said RF in series with said coupler, said second path having an RF choke in series therewith, said opening and closing means comprising a conductive element moveable into and out of said first path in series with said choke and at least a second capacitor essentially transparent to said RF connected in said second path across said conductive element when said element is moved into said first path.

49. The system according to claim 48 wherein said first capacitor and said second capacitor are connected to opposite sides of said coupler.

50. The system according to claim 49 wherein a third capacitor is connected between said coupler and said second capacitor, said moveable conductive element being connected to the junction of said second and third capacitors at one end of said element.

51. The system according to claim 50 wherein a fourth capacitor essentially transparent to RF is connected between said junction and said one end of said conductive element.

52. The system according to claim 47 wherein said first path is connected in bypassing relationship with said second path.

53. The system according to claim 47 wherein a plurality of power supplies providing said power supplying current are connected to said cable, said operative means including means for tapping power current from said cable, said opening and closing means of being in open position to prevent power current from reaching said power current tapping means from more than one of said plurality of supplies.

54. The system according to claim 53 wherein said supplies are AC current power supplies.

55. The system according to claim 52 wherein said cable has a head end from which said CATV signals are provided, said operative means has upstream and downstream ends respectively closer and further from said head end and includes a directional coupler for tapping RF signals propagating in a downstream direction, first, second and third caPacitors essentially transparent to said RF in series with said coupler in said second path said first capacitor being connected between said upstream end and said coupler, said second and third capacitors being connected between said coupler and said downstream end, said second path having an RF choke and switching means connected in series, and said choke being connected to said downstream end and said switching means being connected across said third capacitor.

* * * * *